Feb. 12, 1924.
O. SCHOYEN
1,483,385
DETACHABLE CROSS CHAIN
Filed June 16, 1921
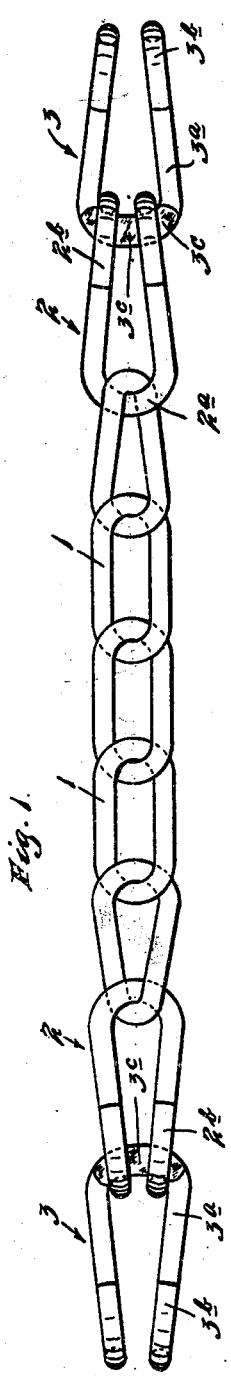
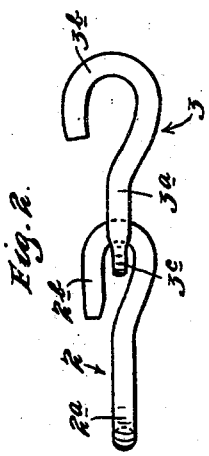
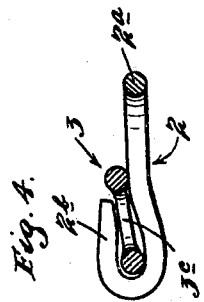
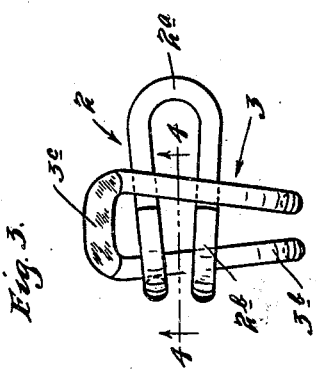
INVENTOR.
OSCAR SCHOYEN.
BY HIS ATTORNEY
James F. Williamson Patented Feb. 12, 1924.

1,483,385

UNITED STATES PATENT OFFICE.

OSCAR SCHOYEN, OF MINNEAPOLIS, MINNESOTA.

DETACHABLE CROSS CHAIN.

Application filed June 16, 1921. Serial No. 477,956.

*To all whom it may concern:*

Be it known that I, OSCAR SCHOYEN, a citizen of the United States, residing at Minneapolis, in the county of Hennepin and State of Minnesota, have invented certain new and useful Improvements in Detachable Cross Chains; and I do hereby declare the following to be a full, clear, and exact description of the invention, such as will enable others skilled in the art to which it appertains to make and use the same.

This invention relates to a cross chain for a tire and forms part of the usual anti-skid chains applied to vehicle tires, particularly to tires of automobile wheels. It is the common practice to have the cross chains so connected to the side chains that a tool is necessary to effect a disconnection of the cross chain. Such tool must always be carried so as to be available when needed. Furthermore, to disconnect the ordinary cross chain and substitute a new one, it is generally a very arduous and disagreeable task and usually results in great soiling of the hands and clothing.

It is an object of this invention, therefore, to provide a cross chain so constructed that the same can be quickly and easily detached from the side chains without the use of any tool or implement and a new cross chain likewise inserted without the use of a tool or implement.

This and other objects and advantages of the invention will be fully set forth in the following description made in connection with the accompanying drawings in which like reference characters refer to the same parts throughout the different views, and in which—

Fig. 1 is a plan view of the inside of the cross chain;

Fig. 2 is a partial side elevation of the same;

Fig. 3 is a view of the end links showing the same in the position of partial removal; and Fig. 4 is a section illustrating the removal of the links, taken on the line 4—4 of Fig. 3.

Referring to the drawings, a cross chain of usual or any standard type of construction is shown comprising the links 1. At each end of the chain is a link 2 having a straight bight portion $2^a$, the ends of which are reversely bent to form hooks $2^b$. The end link 3 is connected to the hook members $2^b$ of the link 2 and this link also has a straight bight portion $3^a$, the ends of which are formed into hooks $3^b$ adapted to be clinched over a link in the side chain which passes circumferentially around the tire. The rear portion of the bight $3^a$ is flattened, as shown at $3^c$, to be of smaller cross section so that the thickness of the link at this point is less than the width of the space between the ends of the hooks $2^b$ and the straight portion of the link 2. The width of the bight $3^a$ is somewhat smaller than the normal distance between the hooks $2^b$, so that when the links 2 and 3 are engaged, as shown in Fig. 1, the hooks $2^b$ are pressed somewhat toward each other and are tightly held against the sides of the link 3.

With this construction the chain comprising the links 1 and 2 can be quite readily detached from the link 3 which is permanently attached to the side chain. To effect such a detachment, the link 3 is first turned so that its longitudinal center line will be normal to that of link 2. This link 3 is then rotated about the axis of its side which is in the hooks $2^b$ through substantially 180 degrees to bring it into the position shown in Fig. 3. When in this position, the link can now be slid longitudinally across the link 2 and the flattened portion $3^c$ will slide out laterally through the space between the end of the hooks $2^b$ and the body of the hook 2, as can be clearly seen from the section in Fig. 4. If it is only desired to replace the chain formed by the links 1, the link 2 can be readily removed from the end link 1 by simply withdrawing one end through said link. The new chain can now be quickly hooked into the links 2 and these links connected to the links 3 by reversing the operation above described.

The fact that the ends of link 2 spring outwardly prevents any material longitudinal relative movement of the links 2 and 3 and the links cannot be moved sufficiently longitudinally to separate the same so that there is no danger of the chain being accidentally disconnected. The resilient spreading of the hooks $2^b$ also insures a firm connection between the links 2 and 3 tending to eliminate rattling.

From the above description it is seen that applicant has provided a simple and efficient detachable cross chain and one that can be quickly detached and replaced with a minimum amount of inconvenience. Such a device has great utility as it is often impossible for taxicabs and other vehicles to stop and go through prolonged operation to change a cross chain and much damage often results by a broken or loose chain striking parts of the vehicle.

It will, of course, be understood that various changes may be made in the form, details and arrangement of the device without departing from the scope of applicant's invention, which, generally stated, consists in the matter shown and described and set forth in the appended claims.

What is claimed is:

1. A cross chain comprising an end link having a straight bight portion and hooked end portions which are adapted to be attached to a standard side chain, a link connected to said end link also having a straight bight portion and also having hooked ends adapted to engage through the bight portion of said end link, the ends of the hooks on the second mentioned link being spaced from the body portion thereof and the end of the bight portion of the first mentioned link being flattened sufficiently to pass through said space when turned and slidden out crosswise thereof.

2. A cross chain comprising an end link having a bight portion and adapted to be connected to a standard side chain, a link connected to said end link also having a bight portion, the ends of which are bent in planes at right angles to the bight portion to form hooks engaging through the bight portion of the end link, said hooks being resiliently movable toward each other and being resiliently held against the side portions of the bight of the end link whereby relative longitudinal movement of said links is substantially prevented, said first mentioned link having its bight portion flattened to pass between the ends of the hook portion and the bight portion of said second mentioned link when turned and slidden out crosswise thereof.

3. A cross chain structure comprising, an end link having a bight portion and having its ends bent into hook form in planes substantially normal to the plane of said bight portion, said hook portions engaging a side chain, a second similarly formed link having its hooked ends engaging the bight portion of said link and having its bight portion engaging the adjacent cross chain link, the bight portion of said first mentioned link being flattened so as to pass under the hooked ends of the second mentioned link when turned and slidden out crosswise thereof.

4. The structure set forth in claim 3, the width of the bight portion of said first named link being somewhat less than the normal spread of the two hooked ends of said second named link, so that when the two links are engaged, the hooks of the second named link will be tightly held against the sides of the first named link.

In testimony whereof I affix my signature.

OSCAR SCHOYEN.